United States Patent
Bach et al.

(10) Patent No.: US 10,106,695 B2
(45) Date of Patent: Oct. 23, 2018

(54) PRINTING INK SYSTEMS

(75) Inventors: Sebastijan Bach, Achsheim (DE); Gerd Hohner, Augsburg (DE); Timo Herrlich, Buehl (DE); Rainer Fell, Gersthofen (DE); Daniela True, Augsburg (DE)

(73) Assignee: Clariant International Ltd., Muttenz (CH)

( * ) Notice: Subject to any disclaimer, the term of this patent is extended or adjusted under 35 U.S.C. 154(b) by 267 days.

(21) Appl. No.: 14/239,040

(22) PCT Filed: Aug. 4, 2012

(86) PCT No.: PCT/EP2012/003347
§ 371 (c)(1),
(2), (4) Date: Jun. 6, 2014

(87) PCT Pub. No.: WO2013/026530
PCT Pub. Date: Feb. 28, 2013

(65) Prior Publication Data
US 2014/0296392 A1    Oct. 2, 2014

(30) Foreign Application Priority Data
Aug. 20, 2011   (DE) .......... 10 2011 111 145

(51) Int. Cl.
| C09D 11/108 | (2014.01) |
| C09D 11/107 | (2014.01) |
| C09D 11/102 | (2014.01) |
| C09D 11/12  | (2006.01) |
| C09D 11/14  | (2006.01) |

(52) U.S. Cl.
CPC .......... *C09D 11/108* (2013.01); *C09D 11/102* (2013.01); *C09D 11/107* (2013.01); *C09D 11/12* (2013.01); *C09D 11/14* (2013.01); *Y02P 20/582* (2015.11)

(58) Field of Classification Search
CPC ... C09D 11/108; C09D 11/102; C09D 11/107; C09D 11/12; C09D 11/14; Y02P 20/582
See application file for complete search history.

(56) References Cited

U.S. PATENT DOCUMENTS

| 3,010,833 A | 11/1961 | Cataldo |
| 3,389,100 A | 6/1968 | Cook |
| 4,041,056 A | 8/1977 | Heintzelman et al. |
| 4,310,356 A | 1/1982 | Trubiano et al. |
| 5,618,338 A | 4/1997 | Kurabayashi et al. |
| 6,080,902 A | 6/2000 | Hermann et al. |
| 2002/0016440 A1 | 2/2002 | Louwet et al. |
| 2004/0126510 A1* | 7/2004 | Wood ............ B41M 5/52  428/32.1 |

FOREIGN PATENT DOCUMENTS

| DE | 10201344 | 9/2003 |
| JP | 2004292746 | 10/2004 |
| WO | WO 2006/060784 | 6/2006 |
| WO | WO 2007.056660 | 5/2007 |
| WO | WO 2010/059562 | 5/2010 |

OTHER PUBLICATIONS

PCT International Search Report for PCT/EP2012/003347, dated Feb. 28, 2013.
English Translation of PCT International Preliminary Report on Patentability for PCT/EP2012/003347, dated Feb. 25, 2014.
DE 10201344, English Abstract, Sep. 18, 2003.
JP 2004292746, English Abstract, Oct. 21, 2004.

* cited by examiner

*Primary Examiner* — Patrick D Niland
(74) *Attorney, Agent, or Firm* — Anthony A. Bisulca

(57) ABSTRACT

The invention relates to a printing ink system containing glycosidic polymers and polyolefin- and/or Fischer-Tropsch-waxes and/or amide waxes and/or bio-based waxes and optionally pigments, binders and/or solvents. The glycosidic polymer has a specific surface area according to BET from a minimum 0.45 m2/g and a particle size distribution having an uniformity coefficient (D60/D10) to a maximum of 3.5.

24 Claims, No Drawings

PRINTING INK SYSTEMS

The invention relates to printing ink systems comprising glycosidic polymers and at the same time hydrocarbon and/or amide waxes and/or bio-based waxes, and to the use of polyglycoside/wax combinations in printing inks for improving the settling and redispersion behavior and of a significant improvement in rub fastness.

Printing ink systems are generally composed of the main components colorant, binder and solvent. Moreover, they comprise additives for establishing the desired use properties. Thus, polyolefin waxes are usually added in order to impart rub and scratch fastness to the imprinted surfaces (cf. e.g. Fette Seifen Anstrichmittel 69, No. 8, page 589 (1967); dto. 73, No. 4, page 231 (1971)). Effective rub protection is of importance particularly for those printed articles which are subjected to mechanical stresses, whether in a printing machine, upon stacking, during transportation or upon use. This is true especially for packaging materials.

The use of glycosidic polymers and derivatives, in particular polysaccharides as additive in printing inks has already been described.

DE-10201344 describes polysaccharides, specifically polyglucoses and polygalactomannoses as thickeners for aqueous printing inks. The water-soluble polysaccharides used thus serve as rheology auxiliaries.

In U.S. Pat. No. 3,010,833, additization of an oil-based printing ink with an aqueous cellulose ether and also an aqueous starch preparation achieves a reduction in the undesired offsetting, which is understood as meaning the bleeding of the freshly printed ink to the sheet on top. The considerable separation tendency of the variously polar systems is suppressed by partially oxidized oil (emulsifier) as a further component in conjunction with vigorous stirring.

U.S. Pat. No. 3,389,100 describes corn starch in oil-based printing ink as additive for the antislip finishing of imprinted cardboard. An addition of microcrystalline paraffin wax simultaneously serves to increase the rub protection. The corn starch/wax ratio in the claimed mixture is (0.5-2.5%)/(5-7%).

The application JP-2004292746 claims rub-resistant aqueous printing inks whose components consist of 70-90% by weight of shellac and 10-30% by weight of esterified starch.

WO-2006060784 describes aqueous printing inks which, besides colorants, comprise high molecular weight polysaccharides, such as e.g. starch also dextrins, maltodextrins, as well as a water-soluble acrylate polymer as emulsifier. The high molecular weight starch improves inter alia the ability of the imprinted cellulose-containing substrate to be recycled ("repulpability").

The document U.S. Pat. No. 4,310,356 discloses aqueous newspaper printing inks with a content of 3-60% by weight of "dispersed starch". Since starch in water exhibits a very pronounced settling behavior, oligomeric saccharides, so-called dextrins and/or acetylated dextrins and/or hydrolyzed polysaccharides are also used. During printing, formulations of this type exhibit an overall improved drying behavior and improved appearance.

The use of glycosidic polymers in printing ink formulations has thus already been described. A disadvantage here, however, is the fact that the polysaccharide component in the liquid printing ink has a tendency to rapidly settle out. This is the case to a particular extent for printing ink systems with low viscosity, as are usually present e.g. in the case of relief printing inks. The separation which occurs upon storing the ink hinders handling. The sediment which forms after a short time and consists predominantly of polysaccharide, such as e.g. starch, is extremely compact and can only be redispersed again with difficulty.

Furthermore, the use of polysaccharide-containing inks during the printing process leads, to an increased extent, to "build-up" phenomena on the color-transferring rollers, the latter becoming increasingly coated with polysaccharide particles which ultimately impair the ink transfer and unacceptably impair the printed image.

The advantageous properties of the polysaccharides as additive component in printing inks is therefore countered by a number of serious disadvantages, and there is therefore a need to overcome these disadvantages.

As has surprisingly been found, this is possible by using polysaccharides, such as e.g. starch or microcellulose with a certain specific surface area and particle size distribution, and combining these in the printing ink formulation with a polyethylene and/or Fischer-Tropsch wax and/or amide wax and/or natural wax. The combination with wax unpredictably provides for additional stabilization of the formulation.

Moreover, it was surprisingly possible to achieve a significant improvement in rub fastness with this combination as has hitherto not been able to be achieved by means of the individual components.

The invention therefore provides a printing ink system comprising glycosidic polymers and also polyolefin and/or Fischer-Tropsch waxes and/or amide waxes and/or bio-based waxes, and optionally pigments, binders and/or solvents, where the glycosidic polymer has a specific surface area according to BET of minimally 0.45 $m^2/g$ and a particle size distribution with a non-uniformity number (D60/D10) up to at most 3.5.

The invention further provides a method for improving the settling and redispersion behavior and the rub fastness of printing ink systems, wherein polyolefin and/or Fischer-Tropsch waxes and/or amide waxes and/or bio-based waxes, and also polyglycosides which have a specific surface area of $\geq 0.45$ $m^2/g$ and a non-uniformity number $\leq 3.5$ are added to these. The printing ink systems can also comprise pigments, binders or solvents.

Suitable pigments, binders and solvents are in principle all suitable materials as described, for example, in Ullmann's Encyclopedia of Industrial Chemistry, 5th edition, Vol. A 22, chapter on Printing Inks, page 143 ff, Weinheim 1993 or in the previous edition Ullmanns Encyklopädie der technischen Chemie, 4th edition, Vol. 10, chapter on Druckfarben [Printing Inks], page 187 ff.

In the present invention, glycosidic polymers are understood as meaning polymers and polymer derivatives whose repeat monomer units are linked via glycosidic bonds. These include in particular polysaccharides such as e.g. starch, dextrins, maltodextrins, pectins, callose, cellulose, cellulose esters and ethers, and also chitins. Polysaccharides of this type are described e.g. in Ullmann's Encyclopedia of Industrial Chemistry, 5th edition, Vol. A 25, Weinheim 1993, chapter on Starch and other Polysaccharides, page 1, and also in Ullmann's Encyclopedia of Industrial Chemistry, 5th edition, Vol. A 5, Weinheim 1986, chapter on Cellulose, page 375 ff.

On account of their very good availability, naturally occurring polysaccharide variants such as e.g. cellulose, as well as a variety of starches are of particular importance for the present invention.

Cellulose is the most common organic compound in nature and thus also the most common polysaccharide. At about 50% by weight, it constitutes the main constituent of plant cell walls. Cellulose is a polymer consisting of the monomer glucose which is linked via β-1,4-glycosidic bonds and consists of between several hundred to ten thousand repeat units. The glucose molecules are rotated in each case by 180° relative to one another in the cellulose. As a result, the polymer has a linear shape, different to e.g. the glucose polymer starch. Microcellulose (cellulose whiskers) with an enlarged specific surface area can take place e.g. by dissolving out the less crystalline fractions with the help of concentrated acids. According to the invention, therefore, microcellulose in combination with waxes is particularly well suited for use in printing inks on account of its enlarged specific surface area. Besides native cellulose, numerous chemical modifications with thermoplastic properties are also known. These include inter alia methyl cellulose, cellulose acetate and cellulose nitrate.

Starches are macromolecular natural substances built up from glucose units and are another important substance group among the polysaccharides. Starch occurs in plants as a constituent of seed grains, roots, tubers, fruits and marrow and serves, as required, for the metabolic build-up of skeletal substances or for energy production. Morphologically, starch consists of microscopically small particles which have a shape specific in each case for their origin. On account of its chemical make-up, starch does not have a homogeneous composition, but comprises the two structurally different polysaccharides amylose and amylopectin as main constituents. In the former, the glucose molecules are linked with one another linearly via α-1,4-glycosidic bridges; the latter has a branched structure with α-1,4 and α-1,6 linkages. Moreover, native starch comprises secondary constituents, e.g. fatty acids and fats, and also protein-like components, lipoproteins, mineral constituents and, in noteworthy fractions, also water. Suitable types of starch which can be used according to the invention are e.g. cereal starches such as corn starch, wheat starch, rice starch, sorghum starch or barley starch, as well as tuber and root starches such as potato starch, tapioca starch and arrowroot starch. Preference is given to cereal starches, particularly preferably rice starch and corn starch.

The size of starch grains varies according to origin within a wide range and is between 2 and 150 μm. In this connection, rice forms the smallest grains (2-10 μm), corn starch grains generally have a diameter between 10 and 25 μm, and the particles of potato starch are between 20 and 150 μm.

As well as unmodified starch, it is also possible to use chemically degraded starch, as is accessible for example by hydrolysis, oxidation, heat treatment or enzyme treatment of starch raw material, as well as starch derivatized e.g. by esterification, etherification or other chemical root.

Within the context of the invention, particles with a d99 value of ≤20 μm, preferably ≤18 μm are suitable. The d99 value indicates the maximum particle size present in the particle mixture. Corresponding starch powders can optionally also be obtained from coarser starch material by fractionation, e.g. sifting or sieving or by means of micronization. The particle size correlates here with the specific surface area of the particles as follows: the smaller the particles, the larger the specific surface area. Stating the specific surface area of the particles as a parameter for the particle size instead of e.g. d50 or d90 values has the advantage that it implies the total particle size distribution and, moreover, is sensitive for finer particles. This can be explained by the fact that the particle surface area in a first approximation is proportional to the square of the particle diameter, whereas the mass of the particles in a first approximation is proportional to the cube of the particle diameters. By contrast, measuring particle sizes by means of laser diffraction generally has the disadvantage that, as a result of the volume-weighted measuring principle, relatively large particles, in particular agglomerates, are particularly heavily weighted in the determination of d50, d90 values etc. and thus fine particles decline in the distribution function. The specific surface area is therefore a particularly suitable parameter for describing the invention more precisely.

According to the invention, particles with a specific surface area of at least 0.45 $m^2/g$, preferably of at least 0.6 $m^2/g$, particularly preferably of 1.0 $m^2/g$, are suitable.

According to the invention, polyglycosides with non-uniformity numbers less than 5.0, preferably of less than 4.0, particularly preferably 3.0, are suitable.

Based on the printing ink system, the glycosidic polymer component is used in an amount of from 0.1 to 12% by weight, preferably from 0.1 to 6% by weight, particularly preferably from 0.2 to 2% by weight.

Suitable wax components are synthetic hydrocarbon waxes, e.g. polyolefin waxes. These can be produced by thermal degradation of branched or unbranched polyolefin plastics or by direct polymerization of olefins. Suitable polymerization processes are, for example, free-radical processes, where the olefins, generally ethylene, are reacted at high pressures and temperatures to give more or less branched polymer chains; also suitable are processes in which ethylene and/or higher 1-olefins such as e.g. propylene, 1-butene, 1-hexene etc. are polymerized with the help of organometallic catalysts, for example Ziegler-Natta or metallocene catalysts, to give unbranched or branched waxes. Corresponding methods for producing olefin homopolymer and copolymer waxes are described for example in Ullmann's Encyclopedia of Industrial Chemistry, 5th edition, Vol. A 28, Weinheim 1996 in chapter 6.1.1./6.1.2, (high-pressure polymerization, (waxes)), chapter 6.1.2, (Ziegler-Natta-polymerization, polymerization with metallocene catalysts), and chapter 6.1.4, (thermal degradation).

Furthermore, so-called Fischer-Tropsch waxes can be used. These are produced catalytically from synthesis gas and differ from polyethylene waxes by virtue of lower average molar masses, narrower molar mass distributions and lower melt viscosities.

The hydrocarbon waxes used can be unfunctionalized or functionalized by polar groups. The incorporation of such polar functions can take place subsequently by means of corresponding modification of the nonpolar waxes, e.g. by oxidation with air or by grafting-on polar olefin monomers, for example α,β-unsaturated carboxylic acids and/or derivatives thereof, for example acrylic acid or maleic anhydride. Furthermore, polar waxes can be produced by copolymerization of ethylene with polar comonomers, for example vinyl acetate or acrylic acid; also by means of oxidative degradation of relatively high molecular weight, non-wax-like ethylene homopolymers and copolymers. Corresponding examples can be found for example in Ullmann's Encyclopedia of Industrial Chemistry, 5th edition, Vol. A 28, Weinheim 1996, chapter 6.1.5.

Suitable polar waxes are, moreover, amide waxes, as are accessible e.g. by reacting relatively long-chain carboxylic acids, e.g. fatty acids, with mono- or polyvalent amines. Fatty acids typically used for this purpose have chain lengths in the range between 12 and 24, preferably between 16 and 22 carbon atoms, and can be saturated or unsaturated. Fatty acids preferably used are the $C_{16}$- and $C_{18}$-acids, in particular palmitic acid and stearic acid or mixtures of both acids. Besides ammonia, suitable amines are in particular polyvalent, e.g. divalent organic amines, with ethylene diamine being preferred. Particular preference is given to the use of wax produced from technical-grade stearic acid and ethylene diamine and available commercially under the name EBS-Wachs (ethylenebisstearoyldiamide).

Furthermore, it is also possible to use bio-based waxes, which are usually polar ester waxes. In general, bio-based waxes are understood as meaning any waxes which build up on the basis of renewable raw materials. These may either be native or chemically modified ester waxes. Typical native bio-based waxes are described for example in Ullmann's Encyclopedia of Industrial Chemistry, 5th edition, Vol. A 28, Weinheim 1996 in chapter 2, (waxes). These include, for example, palm waxes such as carnauba wax, grass waxes such as candelilla wax, sugar cane wax and straw waxes, beeswax, rice wax, etc. Chemically modified waxes in most cases originate by esterification, transesterification, amidation, hydrogenation, etc. from plant oil-based fatty acids. For example, these also include metathesis products of plant oils.

The bio-based waxes moreover also include montan waxes, either in unmodified or refined or derivatized form. Detailed information relating to waxes of this type can be found e.g. in Ullmann's Encyclopedia of Industrial Chemistry, 5th edition, Vol. A 28, Weinheim 1996, chapter 3, (waxes).

Various processes are suitable for incorporating the waxes into the printing ink system. For example, the wax can be dissolved hot in a solvent and then cooled to give finely divided liquid dispersions or masses of paste-like consistency which are mixed with the printing inks. The grinding of the waxes in the presence of solvents is also possible. According to a widespread technology, the waxes are also stirred into the printing ink formulation as solids in the form of very finely divided powders ("micronizates"). The very fine powders are produced either by grinding, e.g. in air-jet mills, or by spraying. The average particle sizes (d50 or median values) of such powders are generally in the range between 5 and 15 μm. A prerequisite for the grindability to give micronizate is a hardness and/or brittleness of the wax product that is not too low.

Based on the printing ink system, the waxes are used in an amount of from 0.1 to 12.0% by weight, preferably from 0.1 to 6.0% by weight, particularly preferably from 0.2 to 2% by weight.

The glycosidic polymer or polysaccharide can either be incorporated by dispersion before or after additization of the printing ink system with wax; a joint additization by incorporating a mixture of micronized wax and polysaccharide is also possible. It has proven to be particularly advantageous to micronize the glycosidic polymer and the wax together and to use them in the form of a micronized mixture. Here too, the micronized mixture can be incorporated by dispersion before or after the additization of the printing ink system. The dispersion methods are known to the person skilled in the art; as a rule, high-speed stirring or mixing elements, e.g. Mizer or dissolver disks, are used for this purpose.

In combination with polyolefin, Fischer-Tropsch and/or amide waxes and/or bio-based wax, a polysaccharide in the liquid printing ink exhibits a reduced settling tendency, and the sedimented sediment can be more easily redispersed. In addition, the printing inks exhibit a significant rub fastness and thus provide a novel state of the art.

EXAMPLES

Application Tests

The glycosidic polymers tested were starches with different specific surface areas (corn starch, manufacturer Roquette GmbH) (Table 1) and microcellulose (Arbocel MF40/100, manufacturer J. Rettenmaier & Söhne GmbH+Co. KG). Moreover, by sifting corn starch, a particle fraction with a specific surface area according to BET of $O_{sp}$=0.51 m$^2$/g could be used.

The waxes used were the following commercially available products from the range from Clariant Produkte (Deutschland) GmbH:

Ceridust 3610: Micronized polyethylene wax; d99=50 μm.

Ceridust 3620: Micronized polyethylene wax; d99=50 μm.

Ceridust 3910: Micronized amide wax; d99=50 μm.

Ceridust 9615 A: Micronized modified polyethylene wax. D99=32 μm.

Polyethylene wax: Licowax PE 130 for joint micronization with corn starch

The specific surface area was determined by means of the BET method in accordance with ISO 9277:2010. Here, in agreement with the BET theory, the adsorption behavior of N$_2$ at 77.3 K in the relative pressure range between 0.05-0.3 was observed with the help of a Sorptomatic 1990 (Porotec). The samples were dried in the forefield for 5 h at 80° C. in a high vacuum.

The characteristic particle sizes D10 and D60 were determined in accordance with ISO 13320-1 on the basis of a laser diffraction measurement with the help of a Mastersizer 2000 (Malvern). For this, the samples were pretreated with a dry dispersion unit (Scirocco 2000).

TABLE 1

Waxes/glycosidic polymers used

|  | BET surface area [m$^2$/g] | D60 [μm] | Non-uniformity number [D60/D10] |
|---|---|---|---|
| native corn starch | 0.10 | 14.9 | 1.8 |
| sifted corn starch | 0.51 | 7.4 | 2.0 |
| Microcellulose | 0.60 | 7.1 | 3.4 |
| Ceridust 3610 | 0.91 | 6.1 | 2.3 |
| Ceridust 3620 | 0.23 | 9.7 | 2.4 |
| Ceridust 3910 | 0.76 | 8.3 | 2.8 |
| Ceridust 9615 A | 0.88 | 7.1 | 2.3 |
| native corn starch/ Licowax PE 130 (50:50), micronized together | 1.14 | 7.0 | 2.1 |

To determine the rub resistance, the proof was firstly rubbed (rub tester Prüfbau Quartant, rub pressure 48 g/qcm, rub speed 15 cm/s). The intensity of the ink transferred to the test sheet was measured (color difference ΔE according to DIN 6174, measurement using Hunterlab D 25-2, Hunter).

Testing the Settling and Redispersion Behavior

In a measuring cylinder, starch and/or micronized wax were dispersed in a total amount of 2% by weight into 200 g of xylene; the dispersion was left to stand. The layer thickness of the sediment that had settled out after pregiven times was read off. The smaller the ascertained value, the denser the sediment and the greater the settling tendency. The redispersability was tested by inverting the measuring cylinder. The results are shown in the table below.

TABLE 2

Settling and redispersion behavior

| Example | | read-off thickness of the sediment [cm] | | | Redispersability |
|---|---|---|---|---|---|
| | | after 1 h | after 24 h | after 1 week | after 1 week |
| 1 (comp.) | native corn starch | 0.8 | 1 | 1 | Sediment compact, repeated inversion necessary for redispersion |
| 2 (inv.) | native corn starch/Licowax PE 130 (50:50), micronized together | 2.1 | 1.9 | 1.9 | Sediment cloudy to suspended; single inversion suffices for redispersion |

Table 2 shows that the greater the thickness of the sediment, the better the particles can be redispersed. The jointly micronized starch/polyethylene wax mixture exhibited here a significantly reduced settling tendency and the best redispersability. The native corn starch forms a compact sediment that is difficult to redisperse.

Testing a Gravure Printing Ink Based on Toluene:

An illustration gravure printing ink of the type RR Grav Rot based on toluene (Siegwerk Druckfarben AG) was used; for the test prints on gravure printing paper (Algro Finess 80 g/m²), a gravure printing machine LTG 20, Einlehner Prüfmaschinenbau, was used. 1% by weight of additive is added to the ink. Rub resistance, sliding friction coefficient and gloss were measured (Table 3).

TABLE 3

The lines labeled "A" give the results of the prints obtained directly after dispersing the ink: the lines "B" give the results which were obtained with an ink stored for 3 days and then shaken.

| Example | Additive | | Color difference ΔE | |
|---|---|---|---|---|
| | | | Halftone | Fulltone |
| 3 (Comp.) | without additive | A | 16.5 | 24.0 |
| 4 (Comp.) | Ceridust 3610 | A | 3.6 | 3.0 |
| 5 (Comp.) | Ceridust 3910 | A | 19.8 | 38.3 |
| 6 (Comp.) | (Arbocel MF 40/100) | A | 7.9 | 3.2 |
| 7 (Comp.) | native corn starch | A | 2.1 | 2.3 |
| 8 (Comp.) | without wax (printing ink unstable) | B | 3.1 | 2.3 |
| 9 (Inv.) | native corn starch/ | A | 1.4 | 1.6 |
| 10 (Inv.) | Licowax PE 130 (50:50), micronized together | B | 1.2 | 2.0 |
| 11 (Inv.) | sifted corn starch/ | A | 2.6 | 2.3 |
| 12 (Inv.) | Ceridust 3910 7:3 | B | 3.4 | 2.1 |
| 13 (Inv.) | sifted corn starch/ | A | 2.4 | 2.2 |
| 14 (Inv.) | Ceridust 3910 9:1 | B | 3.1 | 2.4 |
| 15 (Inv.) | sifted corn starch/ | A | 2.3 | 2.2 |
| 16 (Inv.) | Ceridust 3610 7:3 | B | 2.3 | 1.8 |
| 17 (Inv.) | sifted corn starch/ | A | 2.2 | 2.2 |
| 18 (Inv.) | Ceridust 3610 9:1 | B | 2.8 | 2.4 |
| 19 (Inv.) | (Arbocel MF 40/100)/ | A | 1.3 | 1.0 |
| 20 (Inv.) | Ceridust 3610 | B | 1.3 | 1.0 |

Table 3 shows especially for examples 9 and 10 a significant improvement in rub resistance for the jointly micronized starch/polyethylene wax mixture (50:50) and an improved rub resistance for inventive examples 11 to 18. The printing ink system (examples 7 and 8) with native corn starch can no longer be used after 4 h. The starch settles out completely at the bottom of the printing ink.

Testing in an Offset Ink
Offset printing ink: mineral oil-based from Epple
Paper: Apco II/II 150 g/m²
Using a Prüfbau test printing machine System Dr. Dürner, prints were prepared and rub properties tested.

TABLE 4

| Example | Wax additive | Amount of additive [% by wt.] | Color difference ΔE | |
|---|---|---|---|---|
| | | | after 3 h | after 24 h |
| 21 (Comp.) | without additive | 0 | 32 | 25 |
| 22 (Comp.) | Ceridust 3610 | 1.5 | 5.8 | 3.5 |
| 23 (Comp.) | native corn starch | 1.5 | 3.2 | 2.8 |
| 24 (Comp.) | (Build-up behavior upon printing) | 3.0 | 3.3 | 2.8 |
| 25 (Comp.) | Arbocel MF 40/100 | 1.5 | 21 3 | 20.7 |
| 26 (Comp.) | | 3.0 | 21.9 | 21.7 |
| 27 (Comp.) | native corn starch/ | 1.5 | 4.2 | 3.0 |
| 28 (Comp.) | Ceridust 3610 (7:3) (Build-up behavior upon printing) | 3.0 | 3.8 | 2.8 |
| 29 (Inv.) | sifted corn starch/ | 1.5 | 2.3 | 1.2 |
| 30 (Inv.) | Ceridust 3610 (7:3) | 3.0 | 1.3 | 1.2 |
| 31 (Inv.) | native corn starch/ | 1.5 | 2.3 | 1.3 |
| 32 (Inv.) | Licowax PE 130 (50:50), jointly micronized | 3.0 | 1.4 | 1.2 |
| 33 (Inv.) | Arbocel MF 40/100/ | 1.5 | 3.5 | 3.4 |
| 34 (Inv.) | Ceridust 3610 (1:1) | 3.0 | 2.6 | 2.4 | n. a.: not applicable

Table 4 shows in particular for examples 29 to 34 a significant improvement in rub resistance. Even examples 27 and 28 show an improvement in rub protection. However, for examples 23-28, the printing ink has a tendency to severely build up on the printing roller, which makes it impossible to use.

Testing in an Aqueous Flexographic Printing Ink

To produce the ink, mixtures of Flexonylblau A B2G (Clariant) and dist. water (5:1; mixture A) and of Viacryl SC 175 W, 40 WAIP (Cytec Ind.) and dist. water (1:1; mixture B) were prepared. 70 parts of mixture B were then slowly stirred into 30 parts of mixture A and the resulting mixture was homogenized at a stirring speed of 1200 rpm for 30 min. 0.5 or 0.8% by weight of starch or starch-wax mixture were incorporated into the ink.

The flexographic printing ink was applied using a film-drawing instrument (Control Coater) using a wire doctor on absorbent flexographic paper (LWC 60 g/m²; 6 µm wet film thickness).

After a drying time of 24 h, the rub protection was measured.

Table 5 shows especially for examples 42 to 45 a significant improvement in rub resistance. Even native corn starch also shows an improvement in rub resistance. The printing ink system (examples 40 and 41) with native corn starch can no longer be used after ca. 4 h. The starch settles out completely at the bottom of the printing ink (see also Table 2).

TABLE 5

| Example | Wax additive | Amount added [% by wt.] | Color difference ΔE |
|---|---|---|---|
| 35 (Comp.) | without additive | 0 | 6.4 |
| 36 (Comp.) | Ceridust 3610 | 0.5 | 3.4 |
| 37 (Comp.) | | 0.8 | 3.7 |
| 38 (Comp.) | Ceridust 9615 A | 0.5 | 3.1 |

TABLE 5-continued

| Example | Wax additive | Amount added [% by wt.] | Color difference ΔE |
|---|---|---|---|
| 39 (Comp.) | | 0.8 | 3.1 |
| 40 (Comp.) | native corn starch | 0.5 | 2.7 |
| 41 (Comp.) | (Printing ink unstable) | 0.8 | 2.4 |
| 42 (Inv.) | sifted corn starch/ | 0.5 | 1.4 |
| 43 (Inv.) | Ceridust 9615 A (7:3) | 0.8 | 1.4 |
| 44 (Inv.) | native corn starch/ | 0.5 | 0.8 |
| 45 (Inv.) | Licowax PE 130 (50:50), jointly micronized | 0.8 | 0.7 |

The invention claimed is:

1. A printing ink comprising a glycosidic polymer and a wax selected from the group consisting of polyolefin waxes, Fischer-Tropsch waxes, amide waxes and bio-based waxes and solvents,
where the glycosidic polymer has a specific surface area according to BET of minimally 0.45 m²/g and a particle size distribution with a non-uniformity number (D60/D10) up to at most 3.5, and wherein the wax is used in micronized form with a d99 value of at most 100 μm.

2. The printing ink as claimed in claim 1, wherein non-modified polyglycosides are used as the glycosidic polymer.

3. A printing ink comprising a glycosidic polymer and a wax selected from the group consisting of polyolefin waxes, Fischer-Tropsch waxes, amide waxes and bio-based waxes and solvents,
where the glycosidic polymer has a specific surface area according to BET of minimally 0.45 m²/g and a particle size distribution with a non-uniformity number (D60/D10) up to at most 3.5, and wherein modified polyglycosides are used as the glycosidic polymer.

4. The printing ink as claimed in claim 1, wherein the glycosidic polymer is used in an amount, based on the printing ink, of from 0.1 to 12.0% by weight.

5. The printing ink as claimed in claim 1, wherein the wax is used in an amount, based on the printing ink, of from 0.1 to 12.0% by weight.

6. A method for improving the settling and redispersion behavior and the rub fastness of a printing ink comprising the step of applying a printing ink-to a substrate, wherein the printing ink comprises a glycosidic polymer and a wax selected from the group consisting of polyolefin waxes, Fischer-Tropsch waxes, amide waxes and bio-based waxes and solvents,
where the glycosidic polymer has a specific surface area according to BET of minimally 0.45 m²/g and a particle size distribution with a non-uniformity number (D60/D10) up to at most 3.5, and wherein the wax is used in micronized form with a d99 value of at most 100 μm.

7. The method as claimed in claim 6, wherein non-modified polyglycosides are used as the glycosidic polymer.

8. The method as claimed in claim 6, wherein modified polyglycosides are used as the glycosidic polymer.

9. The method as claimed in claim 6, wherein the glycosidic polymer is used in an amount, based on the printing ink, of from 0.1 to 12.0% by weight.

10. The method as claimed in claim 6, wherein the wax is used in an amount, based on the printing ink, of from 0.1 to 12.0% by weight.

11. The method as claimed in claim 6, wherein the glycosidic polymer and wax are comminuted by micronization or sifting to a specific surface area, measured in accordance with BET, of at least 0.80 m²/g and a non-uniformity number of less than 3.5.

12. The method as claimed in claim 6, wherein the glycosidic polymer and the wax are micronized together and are used as a micronized mixture.

13. The printing ink as claimed in claim 1, wherein the glycosidic polymer is used in an amount, based on the printing ink, of from 0.1 to 6.0% by weight.

14. A printing ink comprising a glycosidic polymer and a wax selected from the group consisting of polyolefin waxes, Fischer-Tropsch waxes, amide waxes and bio-based waxes and solvents,
where the glycosidic polymer has a specific surface area according to BET of minimally 0.45 m²/g and a particle size distribution with a non-uniformity number (D60/D10) up to at most 3.5, and wherein the glycosidic polymer is used in an amount, based on the printing ink, of from 0.2 to 2.0% by weight.

15. The printing ink as claimed in claim 1, wherein the wax is used in an amount, based on the printing ink, of from 0.1 to 6.0% by weight.

16. The printing ink as claimed in claim 1, wherein the wax is used in an amount, based on the printing ink, of from 0.2 to 2.0% by weight.

17. A printing ink comprising a glycosidic polymer and a wax selected from the group consisting of polyolefin waxes, Fischer-Tropsch waxes, amide waxes and bio-based waxes and solvents,
where the glycosidic polymer has a specific surface area according to BET of minimally 0.45 m²/g and a particle size distribution with a non-uniformity number (D60/D10) up to at most 3.5, and wherein the wax is used in micronized form with a d99 value of at most 30 μm.

18. A printing ink comprising a glycosidic polymer and a wax selected from the group consisting of polyolefin waxes, Fischer-Tropsch waxes, amide waxes and bio-based waxes and solvents,
where the glycosidic polymer has a specific surface area according to BET of minimally 0.45 m²/g and a particle size distribution with a non-uniformity number (D60/D10) up to at most 3.5, and wherein the wax is used in micronized form with a d99 value of at most 20 μm.

19. The method as claimed in claim 6, wherein the glycosidic polymer is used in an amount, based on the printing ink, of from 0.1 to 6.0% by weight.

20. The method as claimed in claim 6, wherein the glycosidic polymer is used in an amount, based on the printing ink, of from 0.2 to 2.0% by weight.

21. The method as claimed in claim 6, wherein the wax is used in an amount, based on the printing ink, of from 0.1 to 6.0% by weight.

22. The method as claimed in claim 6, wherein the wax is used in an amount, based on the printing ink, of from 0.2 to 2.0% by weight.

23. The method as claimed in claim 6, wherein the wax is used in micronized form with a d99 value of at most 30 μm.

24. The method as claimed in claim 6, wherein the wax is used in micronized form with a d99 value of at most 20 μm.

* * * * *